M. M. Manly,
Sawing Stone.
Nº 15,814. Patented Sep. 30, 1856.
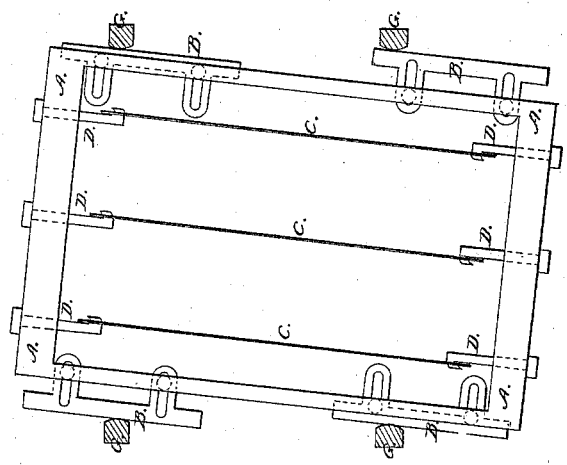
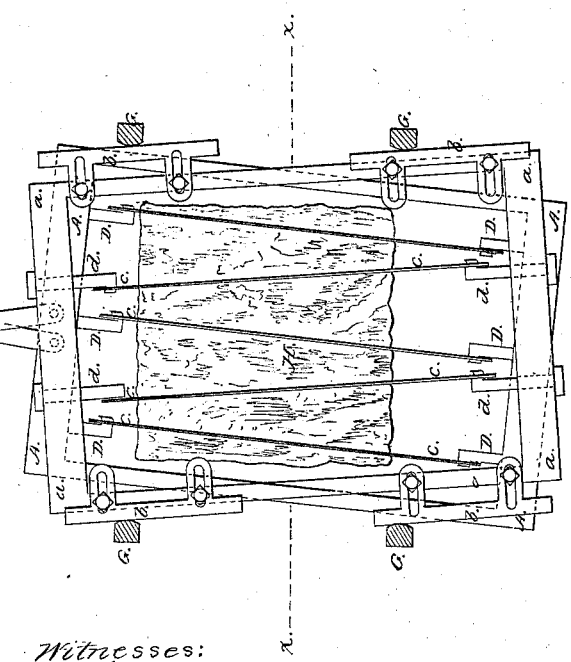
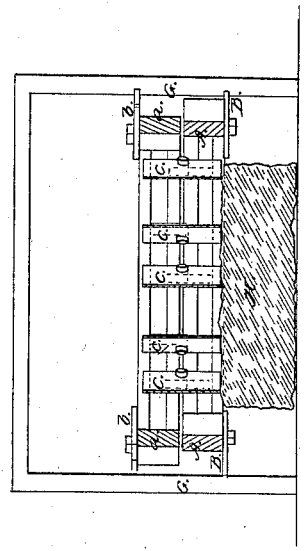
Witnesses:
Inventor:

UNITED STATES PATENT OFFICE.

M. M. MANLY, OF SOUTH DORSET, VERMONT.

MACHINE FOR SAWING MARBLE IN TAPER FORM.

Specification of Letters Patent No. 15,814, dated September 30, 1856.

*To all whom it may concern:*

Be it known, that I, M. M. MANLY, of South Dorset, in the county of Bennington, in the State of Vermont, have invented a new and Improved Machine for Sawing Marble in Tapering or Angular Forms; and I do hereby declare that the following is a full and exact description thereof, reference being had to the accompanying drawings and to the letters of reference marked thereon.

The nature of my invention consists in providing two saw-frames or gates of any of the usual constructions, to each of which are attached marble-saws—in any required number—so that the lower edges of them in each frame shall be in the same plane. These frames or gates run within standards and are directed in their course by adjustable guides attached to the top-sides of them, that enables them to saw the marble to any required taper or angle. These frames or gates may be connected to and worked by one pitman by a forked connection or may be driven by an independent but uniform motion attached to each of them.

To enable others skilled in the art to make and use my invention, I will proceed to describe its construction and operation.

Figure 1 in the accompanying drawing is a top-view of my machine showing the standards, gates, saws and guides—the guides on the lower gate not being shown. Fig. 2 is a plan of the upper saw-gate removed and Fig 3 is a sectional view through the line marked in Fig. 1, similar letters referring to similar parts in each.

A, A, a, a, represent the two saw gates guided in their motion between the standards G, G, G, G, by the adjustable guide-pieces B, B, b, b, on their top sides. To these frames are attached, by the fastenings D, D, d, d, the saws C, C, C, c, c.

H represents the block of marble to be sawed.

As represented in the drawings the whole of the angle is given to the saws in the upper frame, but it may be divided between the two frames and effect the same object. By altering the position of the guide-pieces the saws may be set to saw at any required angle or taper.

The saw-frames or gates may be moved by any of the means now in use for that purpose, viz. by connecting a pitman to one of them with a separate connection from the rod to the other, or they may be operated by a separate pitman to each driven with a uniform motion.

What I claim as my invention and desire to secure by Letters Patent is—

A machine for sawing marble in angular or tapering forms by means of two horizontal saw frames or gates, with adjustable guides, run in connection, one above the other, with the saws running and working in one plane, for the purpose set forth.

M. M. MANLY.

Witnesses:
B. J. MANLY,
C. W. STEARNES.